(12) United States Patent
Bellamy et al.

(10) Patent No.: US 9,297,352 B2
(45) Date of Patent: Mar. 29, 2016

(54) ENERGY CONVERTER

(76) Inventors: Norman West Bellamy, Coventry (GB); Neil Michael Bellamy, Nottingham (GB); Robert Ian Smith, Coventry (GB)

( * ) Notice: Subject to any disclaimer, the term of this patent is extended or adjusted under 35 U.S.C. 154(b) by 902 days.

(21) Appl. No.: 13/505,532

(22) PCT Filed: Nov. 3, 2010

(86) PCT No.: PCT/GB2010/002028
§ 371 (c)(1),
(2), (4) Date: Aug. 16, 2012

(87) PCT Pub. No.: WO2011/055111
PCT Pub. Date: May 12, 2011

(65) Prior Publication Data
US 2012/0299303 A1 Nov. 29, 2012

(30) Foreign Application Priority Data
Nov. 3, 2009 (GB) .................................. 0919233.7

(51) Int. Cl.
*F03B 13/10* (2006.01)
*F03B 13/24* (2006.01)
*F03B 13/18* (2006.01)

(52) U.S. Cl.
CPC ............... *F03B 13/24* (2013.01); *F03B 13/188* (2013.01); *Y02E 10/38* (2013.01)

(58) Field of Classification Search
CPC ......... F03B 13/16; F03B 13/188; F03B 13/24
See application file for complete search history.

(56) References Cited

U.S. PATENT DOCUMENTS

| 4,782,663 A * | 11/1988 | Bellamy | 60/398 |
| 2008/0229745 A1 * | 9/2008 | Ghouse | 60/641.7 |
| 2010/0314871 A1 * | 12/2010 | Jean et al. | 290/42 |
| 2011/0116942 A1 * | 5/2011 | Duffy et al. | 417/331 |

FOREIGN PATENT DOCUMENTS

| GB | 2075217 | 11/1981 |
| WO | 84/00583 | 2/1984 |
| WO | 2008/091208 | 7/2008 |
| WO | 2010/007607 | 1/2010 |

OTHER PUBLICATIONS

International Search Report for corresponding patent application No. PCT/GB2010/02028 dated Aug. 31, 2011.
Written Opinion corresponding patent application No. PCT/GB2010/02028 dated May 3, 2012.
UK Search Report for corresponding patent application No. GB0919233.7 dated Jan. 31, 2011.

* cited by examiner

*Primary Examiner* — Edward Look
*Assistant Examiner* — Daniel Collins
(74) *Attorney, Agent, or Firm* — Renner, Otto, Boisselle & Sklar, LLP (57) ABSTRACT

A wave energy converter (10) for extracting energy from waves in a body of liquid. The converter (10) comprises an inflatable sleeve (12) having an air inlet (14) at or towards one end and an air outlet (18) at or towards its other end. A flexible diaphragm (22) is located within the sleeve (12) so as to extend lengthwise thereof. The diaphragm (22) is sealingly engaged with the sleeve (12) along opposed, elongate edges (22a,22b) thereof. A flexible spine (24) is retained within the diaphragm (22) so as to extend lengthwise thereof. The spine (24) is fixed with the diaphragm (22), relative to the sleeve (12), at or towards each end of the sleeve (12). The converter (10) also comprises a loading device operable to apply an axial compressive force to the spine (24) relative to the sleeve (12) such that, on operation of the loading device, the spine (24) and the diaphragm (22) are buckled into a waveform (26) constrained within the sleeve (12). The waveform (26) has one or more peaks (28) and one or more troughs (30). The spine (24) and diaphragm (24) are drivable to move between first and second opposed positions so as to allow the waveform (26) to travel along the sleeve (26) and pump pockets (46,48) of air contained between opposite surfaces of the diaphragm (22) and the sleeve (12) towards the air outlet (18).

14 Claims, 7 Drawing Sheets

ENERGY CONVERTER

This application is a national phase of International Application No. PCT/GB2010/02028 filed Nov. 3, 2010 and published in the English language.

The invention relates to apparatus for extracting energy from waves in a body of liquid.

The movement of air caused when wind blows over an extensive stretch of water, such as an ocean, sea, lake, river or canal, generates waves on the surface of the water as the moving air displaces the water and thereby transmits energy to the water.

The energy stored in ocean and sea waves is considerable, the power of waves off the Atlantic coast of the UK typically measuring 70 kW per meter in deep water and dissipating to 20 kW per meter at the shoreline. Storm conditions generate waves having megawatts of power per meter that are destructive in nature, particularly in shoreline surf zones.

Since wind derives from solar energy, sea waves are considered a renewable energy source and the effects of climate change and the depletion of fossil fuels means that it is becoming increasingly desirable to harness the energy stored in sea waves.

The conversion of wave energy into a useful form of energy, such as electricity, has been studied for a number of decades. As a result, numerous patent applications have been filed covering wide-ranging ideas for wave energy converters that seek to exploit this vast energy resource.

Despite the ingenuity of many of these devices, none have proven to be successful from a commercial perspective, and only a few have been demonstrated in full-scale trials. This is mainly a result of the engineering costs associated with extracting energy from sea waves.

A problem is that sea waves are generally random in height, period and direction. On a wave to wave basis, instantaneous power levels vary by the square of the wave height. Consequently the wave power profile varies from zero to random peaks every half wave cycle. A typical Atlantic wave energy site may, for example, have an average power level of 50 $kWm^{-1}$ peaking up to a disruptive 10 $MWm^{-1}$ in storm conditions. This rapid variability of power levels provides a challenge for designers seeking to design wave energy converters that can survive and harness wave power.

A solution involves locating wave energy converters on the shoreline, where the energy levels and thus destructive power of waves are less than at sea, and thus where operating and maintenance costs of the wave energy converters are significantly less than for sea-based devices.

Such shoreline devices, often including oscillating water columns (OWCs), have however provided disappointing results due to the significantly reduced amount of energy available at the shoreline.

Another solution involves locating primary capture equipment at sea or on the sea bed, where energy levels are high, and piping hydraulic fluid or high pressure water ashore where the fluid power is converted to electricity. Again such devices have proven unsuccessful, largely due to the mechanical complexity and the small output power of such devices.

Floating offshore wave energy converters benefit from higher incident wave powers than shore based units. Such devices however involve relatively significant structural and machinery costs, and have also therefore proven to be uneconomic. Attempts have been made to reduce the size of such devices, but the resulting mechanical complication has been found to add further costs.

The use of membrane air bags to capture energy, combined with pneumatic power conversion, has marginally reduced structural and machinery costs but not at a sufficient level to have a significant impact on the total cost of the energy delivered.

The designs of wave energy converters typically fall into six groups: point absorbers, attenuators, terminators, overtopping reservoirs and submerged seabed devices. Attenuators are seen as the most promising of these devices.

Attenuators generally consist of relatively long, floating devices, which are typically flexible and operate normal to the wave front so as to effectively ride the waves. As a result, such wave energy converters experience lower forces than terminators, which is considered to increase survivability, Long attenuators are also able to benefit from energy diffraction, which effectively increases the capture width. This is because energy is drawn from the sides of the device.

Many attenuator designs of wave energy converters are self-reacting and consist of raft structures that bridge about one wavelength in the direction of travel of waves, such as the UK Pelamis. Devices of this type use hydraulics to extract energy from the relative movement of neighbouring segments, and onboard power conversion includes hydraulic accumulators to smooth the pulsing power that results before driving generators that feed electricity through subsea cables to land.

Such devices rely on mass and buoyancy to lever across the hinges between the neighbouring segments in order to drive the hydraulic power take-off. Mass and buoyancy are however expensive to provide at sea and often result in large raft structures and associated heavy duty hinges.

As will be appreciated, whilst wave power as a renewable source of energy is an attractive idea, the high cost associated with operating known wave energy devices to convert energy and deliver it to land, has held back further development of wave power. Recent assessments of the realistic cost of electricity produced using current "front runner" wave power devices suggests that energy produced using wave power is nearly five times as expensive as energy produced from fossil fuel sources. A more radical approach is therefore required to reduce device costs and improve energy capture efficiency.

The majority of the cost of most wave energy devices is determined by the structure of the device and the mechanical and electrical equipment (M&E) used in the device. The cost of conventional sea-based structures could be reduced through the use of self-reacting principles and flexible membrane constructions. The cost may also be reduced by moving the M&E elements of such devices to land. The costs associated with locating M&E elements on land are much lower. This is because locating M&E elements on land avoids the need for expensive mass at sea, which adds cost at every stage of manufacture, deployment and operation.

Furthermore, the majority of devices capture power at wave orbital velocities of around 1 $ms^{-1}$. Surface wave propagation phase velocities on the other hand are around 15 $ms^{-1}$ in the North Atlantic. Consequently, it is anticipated that capturing power by pneumatic means and utilising the higher unidirectional velocity of surface waves will provide a significant advantage in terms of energy density. It is also anticipated that it will provide the opportunity to transfer power to land by means of compressed air as opposed to electricity.

Onboard pneumatic power conversion is a preferred option for many wave energy converters because it offers the most flexible of solutions, particularly in devices employing oscillating water columns (OWCs). OWCs however generate reversing air flow, which has proven difficult to convert efficiently to electricity through self-rectifying turbines. This is a result of the wide dynamic range of the incident wave power.

Direct generation of unidirectional air flow is difficult to achieve and therefore rarely utilised in wave energy converters, despite the fact that it would offer major advantages in terms of efficiency and equipment costs.

Most pneumatic devices use air power at low pressure, but one family of devices claims to increase air pressure and produce compressed air. If a wave energy converter produces compressed air at 6 bars or above, then it becomes a practical and cost effective proposition to pipe the compressed air to land for conversion to electricity. Such an arrangement is attractive in that it allows all mechanical and electrical equipment to be based on land where, as outlined above, equipment, operating and maintenance costs are much lower.

A number of inventors have proposed, and filed patent applications, directed to wave energy converters that use the influence of wave propagation on a flexible, floating, pneumatic hose to extract energy and produce compressed air.

In one method, air pockets and water slugs are injected into a floating flexible pipe and trapped by gravity to match the velocity of the crests and troughs, respectively, of incident waves. Such attenuators are simple and have few moving parts at sea, and could therefore provide a very competitive solution for harnessing wave energy.

In theory, the output pressure in a pipe would be expected to be equivalent to the cumulative differential pressure of all the water heads created by the water slugs. The basic concept can be easily demonstrated in the laboratory through the use of coils of a pipe wrapped around a drum to simulate sequences of waves, and then turning the drum to create cumulative air pressure.

In reality however, the actual wave velocities at sea are too high to pump water along a practical sized pipe. This is because, in such cases, nearly all of the energy generated within the pipe is lost through friction generated between the walls of the pipe and the water, and the turbulence resulting therefrom. Devices using water slugs do not therefore present a practical solution to harnessing wave energy.

According to a first aspect of the invention, there is provided a wave energy converter for extracting energy from waves in a body of liquid, the converter comprising:
    an inflatable sleeve having an air inlet at or towards one end and an air outlet at or towards its other end,
    a flexible diaphragm located within the sleeve so as to extend lengthwise thereof, the diaphragm being sealingly engaged with the sleeve along opposed, elongate edges thereof,
    a flexible spine retained within the diaphragm so as to extend lengthwise thereof, the spine being fixed with the diaphragm, relative to the sleeve, at or towards each end of the sleeve; and
    a loading device operable to apply an axial compressive force to the spine relative to the sleeve such that, on operation of the loading device, the spine and the diaphragm are buckled into a waveform constrained within the sleeve, the waveform having one or more peaks and one or more troughs, and the spine and diaphragm being drivable to move between first and second opposed positions so as to allow a waveform to travel along the sleeve and pump pockets of air contained between opposite surfaces of the diaphragm and the sleeve towards the air outlet.

The provision of a structure that drives movement of air along the length of an inflatable sleeve, in use, results in a buoyant structure that is able to float on the surface of a body of liquid. This enables the wave energy converter to be arranged so as to extend in a normal manner relative to the direction of travel of incident waves so that the waves may be harnessed to drive movement of the spine and diaphragm when the loading device is operated to apply an axial compressive force to the spine. The resultant pumping of pockets of air contained between opposite sides of the diaphragm and the sleeve acts to increase the pressure of air contained within the resultant pneumatic sleeve, and a cumulative air pressure is therefore achievable at the air outlet.

A flexible sleeve filled with air can be constrained to follow a wave surface by virtue of its buoyancy and surface suction. The mass and stiffness of the sleeve are however relatively low. Consequently the natural bending frequency of the sleeve is inherently too high to permit efficient extraction of wave energy from waves incident on the sleeve. The provision of a reaction member that resists the flexing motion of the sleeve in the vertical plane, in the form of a spine retained within a diaphragm extending lengthwise of the sleeve, facilitates extraction, in use, of energy from typical sea waves.

An elastic beam, or spine, under axial compression will buckle at a particular wavelength, and this can be tuned by adjusting the stiffness EI of the spine, where E is Young's modulus and I is the area moment of inertia of the spine cross-section, or by adjusting the size of the axial compressive force applied to the spine.

Location of such a spine within a diaphragm, inside a flexible sleeve, and operation of a loading device to apply an axial compressive force to compress the spine relative to the sleeve results in the application of axial tension to the sleeve. The internal diameter of the sleeve limits the lateral excursions of the buckled spine and diaphragm, which, in turn, promotes multiple buckling wavelengths, and also prevents any instability due to extreme buckling. In use, energy captured from incident waves is induced into the waveform defined by the spine and diaphragm as elastic strain energy, and this energy flows along the waveform as flexural waves. These flexural waves drive movement of the spine and the diaphragm to drive pockets of air retained between opposite sides of the diaphragm and the sleeve at wave velocity along the inside of the sleeve to produce air power.

The wave energy converter is effective over a broad band of wave periods and enables efficient energy capture.

Engagement of the diaphragm at the peaks and troughs of the waveform created on operation of the loading device creates a rolling seal between the opposite surfaces of the diaphragm and the sleeve during travelling movement of the waveform along the sleeve, thereby allowing the pumping of air pockets between the opposite surfaces of the diaphragm and the sleeve along the sleeve. This rolling seal arrangement avoids wear problems that might otherwise occur through the use of sliding seals.

Sealing engagement between opposed, elongate edges of the diaphragm and the sleeve locates the diaphragm within the sleeve.

It is envisaged that in relatively low operating pressure embodiments of the wave energy converter, the sealing engagement between opposed elongate edges of the diaphragm and the sleeve may be achieved through the use of a diaphragm sealing strip that fits tightly in an elastic, flexible sleeve, thereby providing a contact hinge seal along the bead edges of the sleeve.

In other, relatively higher operating pressure embodiments of the wave energy converter, the sealing engagement between opposed elongate edges of the diaphragm and the sleeve may be achieved through the use of a diaphragm sealing strip having elastic hinges that fit loosely in a flexible sleeve to accommodate the hinge arrangement. The resultant diaphragm design is more complex, but the rounded sleeve design is suited to higher operating pressures.

In order to further compress the air contained between opposite sides of the diaphragm and the sleeve as it is pumped towards the air outlet, in use of the wave energy converter, the diameter of the sleeve preferably reduces in size between the air inlet and the air outlet.

Typical average Atlantic waves are 4 m high with energy periods of 10 s, wavelengths of 150 m and wave velocities of 15 $ms^{-1}$. The size of the resultant driving force available to drive movement of the spine and diaphragm when such waves are incident on the wave energy converter requires that the waveform defined by the spine and diaphragm exhibits a sufficient stiffness. The spine and diaphragm will otherwise be unable to absorb energy from the incident waves, thereby rendering it impossible to couple the waves to drive movement of the spine and diaphragm to pump pockets of air towards the air outlet.

Preferably the loading device is operable to axially compress the spine relative to the diaphragm such that, on operation of the loading device, the stiffness of the waveform defined by the buckled spine and diaphragm is greater than the stiffness of the spine and diaphragm prior to operation of the loading device.

The inventors have discovered that axially compressing the spine relative to the diaphragm results in the creation of a waveform defined by the buckled spine and diaphragm having a significantly greater stiffness than the stiffness of the diaphragm prior to operation of the loading device.

If the waveform defined by the spine and diaphragm is too flexible, the spine and diaphragm will not extract much energy from the waves incident on the sleeve when the wave energy converter is floated on the surface of a body of liquid. Hence, vertically acting reaction forces required between the wave energy converter and the surface of the body of liquid would be minimal to maintain the wave energy converter in contact with the surface of the body of liquid and would only harness a minimum amount of energy from the incident waves to drive movement of the spine and the diaphragm.

Increasing the stiffness of the waveform defined by the spine and the diaphragm, increases the energy required to drive movement of the spine and the diaphragm and thereby increases the size of any reaction forces between the wave energy converter and the surface of the body of liquid created when a wave is incident on the sleeve. It therefore allows effective harnessing of the incident waves to drive movement of the spine and diaphragm so as to drive the waveform along the sleeve. It will be appreciated that determining the balance between stiffness and flexibility of the waveform defined by the spine and the diaphragm requires careful adjustment and will be determined by the power of the waves likely to be encountered during use of the wave energy converter.

In particularly preferred embodiments, the spine extends centrally along the length of the diaphragm and the loading device is operable to axially compress the spine relative to the diaphragm so that, on operation of the loading device, the diaphragm defines a concave cross-section at the or each peak of the waveform and a concave cross-section at the or each trough of the waveform, the concave cross-sectional shape of the diaphragm at the or each peak being inverted compared to the cross-sectional shape of the diaphragm at the or each trough, and the cross-sectional shape of the diaphragm extending between the or each adjacent peak and trough changing along its length between the inverted concave cross-sections.

The application of an axially compressive force to the centrally located spine, relative to the diaphragm, seeks to stretch the diaphragm along its central line and results in the application of a tensile load along the opposed, elongate edges of the diaphragm. This tensile load dissipates with distance from each edge, towards the central line, so that the tensile load is least along the central line of the diaphragm. This tensile load distribution across the width of the diaphragm leads to the creation of opposed concave cross-sections at the peaks and troughs of the resultant waveform and thereby results in a structure that is stable in two distinct, opposed shapes.

The waveform at the or each peak and the or each trough has an outer convex surface that seals against an adjacent internal surface of the sleeve. This bi-stable action of the waveform within the sleeve defines air passages above or below the diaphragm, depending on the particular stable state.

The resultant waveform exhibits a relatively significant resistance to initiation of movement of the spine and the diaphragm between the first and second opposed positions at peaks and troughs in the waveform on the application of a force from an incident wave. This is because the stiffness of the spine-diaphragm structure increases due to a change in the area moment of inertia of the cross-sectional area of the waveform at the peaks and troughs. However the structure also means that once a sufficiently large force is applied to overcome this resistance to initiation of movement, thereby minimising any vertically acting reaction force between the wave energy converter and the surface of a body of liquid, the cross-sectional shape of the waveform will move, or effectively "flip", into the opposed cross-sectional shape relatively quickly and easily.

It will be appreciated that the stiffness of the waveform may be adjusted by operating the loading device to adjust the axial compressive force applied to the spine relative to the diaphragm.

At transition sections between peak and troughs of the waveform, the waveform defines a flat cross-section and the stiffness of the waveform in these transition sections is therefore is reduced to the natural stiffness of the spine. This enables a rapid transition, in use, every half wavelength.

The creation of a waveform in which the diaphragm defines opposing concave cross-sectional shapes at the peaks and troughs therefore results in a relatively stiff yet flexible structure that is able to absorb kinetic energy, in use, from waves incident on the sleeve when the wave energy converter is floated on the surface of a body of liquid. It therefore facilitates coupling of incident waves to drive movement of the spine and diaphragm to pump pockets of air towards the air outlet.

Retention of the spine within the diaphragm allows the spine to drive the diaphragm upwards during the crest of the wave into one state and downwards during the trough of the wave into the alternative inverted state. The transition between stable states will take place near the points of inflexion of the waveform in the form of an inverting seal action of the diaphragm that pumps the air along the sleeve. Each crest in the wave train increases the pressure at each inverting seal, and pumps air along the top passages within the sleeve. Simultaneously, the troughs pump air in the lower passages to add to the air flow. It will be appreciated that the output air pressure, and therefore compressed air power, increases with the length of the sleeve and is expected to achieve 6 bar, and megawatts of power, for a 1 km long, 1 m diameter, sleeve.

Preferably the cross-sectional shape of the diaphragm extending between the or each adjacent peak and trough changes along its length between the inverted concave cross-sections in a linear manner.

Such an arrangement ensures a uniform reaction of the spine and diaphragm on the application of a driving force to drive movement of the waveform along the length of the sleeve and thereby further facilitates coupling of incident waves to drive movement of the spine and diaphragm.

The loading device preferably includes a fixing device to retain the spine in an axially compressed position relate to the diaphragm on operation of the loading device.

Preferably the loading device is operable to apply a variable axial compressive force to the spine to facilitate adjustment of the wavelength of the waveform.

This facilitates tuning of the waveform to match the wavelength of incident waves that are likely to be encountered by the wave energy converter in use. This is advantageous because the spine and diaphragm will oscillate at a resonant frequency when they are driven to move by incident waves that correspond in wavelength to the wavelength of the waveform. Oscillation of the spine and diaphragm at a resonant frequency maximises the speed at which the waveform travels along the sleeve and thereby maximises the efficiency with which pockets of air are pumped towards the air outlet. As such it acts to amplify the power absorption from incident waves, and maximises the efficiency of energy absorption from the waves incident on the wave energy converter.

The buoyant nature of the wave energy converter in use will result in a relatively light, floating structure, which will resist sinking of the wave energy converter. As a result however any reaction force generated between the wave energy converter and the surface of a body of liquid is relatively low. As outlined above, vertically acting reaction forces between the wave energy converter and the surface of the body of liquid are required to maintain the wave energy converter in contact with the surface of the body of liquid and to facilitate effective harnessing of the incident waves to drive movement of the spine and the diaphragm. The wave energy converter is not therefore able to absorb energy from incident waves in an efficient manner and is vulnerable to being blown out of engagement with the body of liquid by even light winds. In preferred embodiments therefore the wave energy converter further includes one or more fins extending outwardly from opposed sides of the sleeve, each of the fins defining a planar contact surface and being connected to the sleeve at predetermined positions relative to the opposed edges of the diaphragm sealingly engaged with the sleeve such that, in use, the planar contact surfaces of the fins engage the surface of a body of liquid.

On engagement of the planar contact surfaces of the fins with the surface of a body of liquid, atmospheric pressure will create a downward force on the opposite surfaces of the fins and force air from between the contact surfaces of the fins and the liquid surface. This results in the creation of a vacuum between each of the contact surfaces of the fins and the liquid surface. The resultant suction resists movement of the planar contact surfaces of the fins away from the liquid surface, which in turn acts to hold the sleeve in floating engagement with the liquid surface. The provision of fins therefore eliminates the need for the addition of mass to the wave energy converter in the form of expensive ballast in order to generate the vertically acting reaction forces required, in use, to facilitate effective harnessing of the incident waves to drive movement of the spine and the diaphragm and to maintain the wave energy converter in floating engagement with the liquid surface.

Arranging the fins at predetermined positions relative to the opposed edges of the diaphragm sealingly engaged with the sleeve ensures that the sleeve is held in position in floating engagement with the liquid surface so that the waveform defined by the spine and the diaphragm is maintained in an orientation relative to the liquid surface that allows coupling of incident waves to drive movement of the spine and the diaphragm.

The components of the wave energy converter are preferably manufactured from flexible material to allow them, in use, to follow wave surface profiles with minimum resistance.

The sleeve may be formed from a reinforced elastic material, which may be provided in the form of a rubber membrane material reinforced with high tenacity cords oriented to provide the desired flexibility characteristics. A similar material may be used to form any fins attached to the outer surface of the sleeve.

The spine is preferably formed from a metallic or plastic spring material, which may be chosen from the group including spring steel, polycarbonate and plastic fibre-resin composite.

In embodiments of the invention, the spine may be inflatable to improve the flexibility of the spine in a deflated configuration, thereby allowing coiling of the wave energy converter for storage and transportation, whilst providing sufficient stiffness on inflation of the spine.

The diaphragm is preferably formed from a flexible composite material having both elastic and spring characteristics, and is preferably profiled to provide a pressure air seal within the sleeve. The flexible composite material may be a reinforced rubber material and particularly preferred embodiments includes a composite structure of a plastic or metal spring skeleton, covered in rubber material to provide good sealing qualities, and edged with a corded bead.

The length of the wave energy converter is preferably chosen to correspond to at least one wavelength of the waves likely to be incident on the wave energy converter in use, and preferably to a multiple of the wavelength of such waves. The wavelength of Atlantic waves is typically in the range of 100-150 m. In particularly preferred embodiments therefore the sleeve has a length in the range of 100-1500 m.

So as to facilitate easy storage and transportation of the wave energy converter, the sleeve, diaphragm and spine are preferably formed to define a flexible, layflat construction. This allows the wave energy converter to lay flat when no axial compressive force is applied to the spine by the loading device, and permits the wave energy converter to be wound into a coil for storage and transportation purposes.

In order to convert the compressed air pumped to the air outlet of the sleeve, the air outlet is preferably coupled to a collector. The collector may include a compressed air pipe, a compressed air tank and/or an air turbine to generate electrical power.

Any compressed air tank and/or air turbine is preferably located, in use, on land so as to reduce the mass of the wave energy converter, the air tank and/or air turbine being connected to the air outlet of the sleeve via a compressed air pipe or a flexible riser connection. It is envisaged however that the compressed air could be converted at the stern section of the wave energy converter to electrical power for transmission to land by cable.

In other embodiments a compressed air tank may be located, in use, on the sea bed. This allows the compressed air tank to be located below or at least in the vicinity of the wave energy converter, and thereby reduces the length of any compressed air pipe required to extend between the tank and the air outlet of the sleeve. Compressed air stored in the tank may then be piped to land when required to generate electricity.

The end of the sleeve including the air inlet, typically referred to as the bow section of the wave energy converter, is preferably formed in a part structural manner to enable the heave motion at the bow to lever the bending moment that initiates the travelling movement of the waveform along the sleeve. Mooring forces for attenuators are relatively low and the bow of the wave energy converter is therefore preferably moored in use to maintain position. The spine and diaphragm terminations at the bow section, to fix the spine and diaphragm relative to the sleeve at the bow end, also preferably match the expected wave propagation characteristics of the spine and the diaphragm to ensure that travelling movement of the waveform along the sleeve is initiated with ease.

The end of the sleeve including the air outlet, typically referred to as the stern section, is also preferably formed in a part structural manner to support the spine and diaphragm terminations. Again the spine and diaphragm terminations at the stern section, to fix the spine and diaphragm relative to the sleeve at the stern section, also preferably match the expected wave propagation characteristics of the spine and the diaphragm, to ensure that travelling movement of the waveform along the sleeve is terminated effectively.

Preferably, in use, the stern section would be slack moored to limit stern movement of the wave energy converter and maintain the wave energy converter in alignment with the direction of travel of incident waves.

It is envisaged that in a given sea state, a sleeve having a diameter of 1 m and a length of 1 km, could deliver compressed air at say 6 bar, through a 2000 m pipe, and therefore provide a potential output of several megawatts of electrical power.

The overall advantage of the wave energy converter according to the invention is the competitive low energy cost that results from using compliant materials to build a tuneable, self-reacting energy capture system that produces compressed air that may be transmitted to land before final M&E conversion to electricity.

According to a second aspect of the invention there is provided a method of extracting energy from waves in a body of liquid using a wave energy converter according to the first aspect of the invention, the method comprising the steps of:

operating the loading device to apply an axial compressive force to the spine to buckle the spine and the diaphragm into a waveform constrained within the sleeve; and floating the flexible sleeve on the surface of the body of liquid so as to extend to tangentially relative to the direction of travel of the waves such that the incident waves travel from the air inlet towards the air outlet.

Preferably the method further includes the step of operating the loading device of the wave energy converter to adjust the axial compressive force applied to the spine so as to buckle the spine and the diaphragm into a waveform having a wavelength corresponding to the wavelength of the incident waves.

Other advantageous features of the invention are recited in Claims 19 to 36 and references in these claims to hose are intended to be coterminous with references throughout the remainder of the description to sleeve.

Preferred embodiments of the invention will now be described, by way of non-limiting examples, with reference to the accompanying drawings in which.

A wave energy converter 10 for extracting and converting the energy of waves in a body of liquid, typically the sea or ocean, according to an embodiment of the invention, is shown in FIGS. 1 to 5 and FIGS. 6*a* to 6*d*.

The wave energy converter 10 includes an inflatable sleeve 12 having an air inlet 14 (FIG. 2) at a bow end 16 of the sleeve 12 and an air outlet 18 (FIG. 2) at a stern end 20 of the sleeve 12.

A flexible diaphragm 22 is located within the sleeve 12 so as to extend lengthwise of the sleeve 12. The diaphragm 22 is sealingly engaged with an inner surface of the sleeve 12 along opposed, elongate edges 22*a*,22*b* by means of longitudinal flexible hinges (not shown). A spine 24 is retained within the diaphragm 22 so as to extend lengthwise of the diaphragm 22. The spine 24 is fixed with the diaphragm 22, relative to the sleeve 12, at both the bow end 16 and the stern end 20.

The wave energy converter 10 also includes a loading device 25 that is operable to apply an axial compressive force to the spine 24 relative to the sleeve 12.

On operation of the loading device 25, the spine 24 and the diaphragm 22 are buckled into a waveform 26 constrained within the sleeve 12, as shown in FIGS. 4 to 6*c*. In the schematic illustration shown in FIGS. 4 to 6*c*, the resultant waveform 26 defines a single wavelength having a single peak 28 and a single trough 30. In working embodiments of the invention, the resultant waveform 26 will include a plurality of wavelengths having a corresponding number of peaks 28 and troughs 30.

The loading device 25 is preferably operable to allow adjustment of the axial compressive force to allow adjustment of the wavelength of the waveform 26. This facilitates tuning of the wave energy converter 10 so as to match the wavelength of the waveform 26 to the wavelength of waves likely to be encountered during use of the wave energy converter 10.

The wave energy converter 10 includes a pair of flexible fins 42 extending outwardly from opposed sides of the sleeve 12. Each of the fins 42 defines a planar contact surface 44. In the embodiment shown in FIG. 1, each of the fins 42 is connected to the outer surface of the sleeve 12 in alignment with a corresponding elongate edge 22*a*,22*b* of the diaphragm 22. In other embodiments it is envisaged that the position of the fins 42 relative to the elongate edges 22*a*,22*b* of the diaphragm may be varied.

Prior to operation of the loading device 25 to apply an axial compressive load to the spine 24, the sleeve 12, diaphragm 22, spine 24 and fins 42 define a layflat construction. This allows the wave energy converter 10 to be rolled into a coil for storage and transportation purposes.

Figure 2:
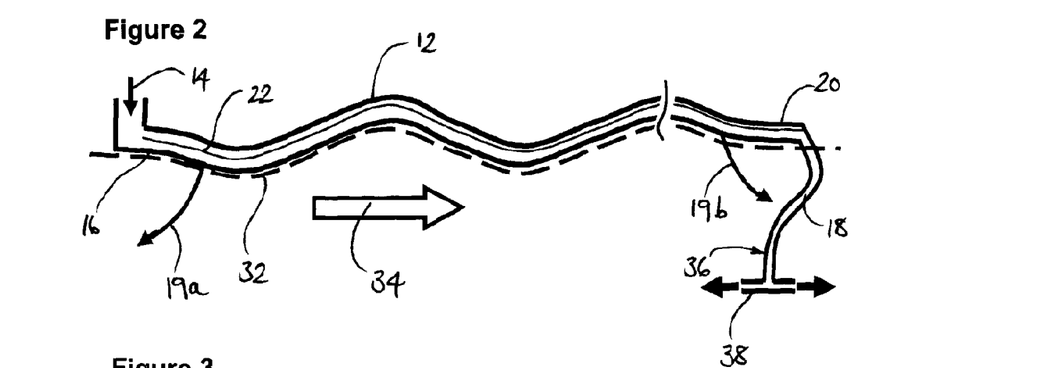

In use, as illustrated in FIG. 2, the wave energy converter 10 is laid onto the surface of a body of liquid where the wave energy converter 10 floats on the liquid surface 32 and contours to contours caused by waves travelling over the liquid surface 32.

Atmospheric pressure creates a downward force on the sleeve 12 and forces air from between the sleeve 12 and the liquid surface. This results in the creation of a vacuum between the sleeve 12 and the liquid surface 32.

Atmospheric pressure also creates a downward force on each of the fins 42 and forces air from between at least a portion of the planar contact surface 44 of each of the fins 42 and the liquid surface 32. This results in the creation of a vacuum between each of the fins 42 and the liquid surface 32.

The suction resulting from the creation of vacuums between the components 12,42 of the wave energy converter 10 resists movement of the wave energy converter 10 away from the liquid surface 32. Ballast is not therefore required to maintain the sleeve 12 in floating engagement with the liquid surface 32.

Figure 1:
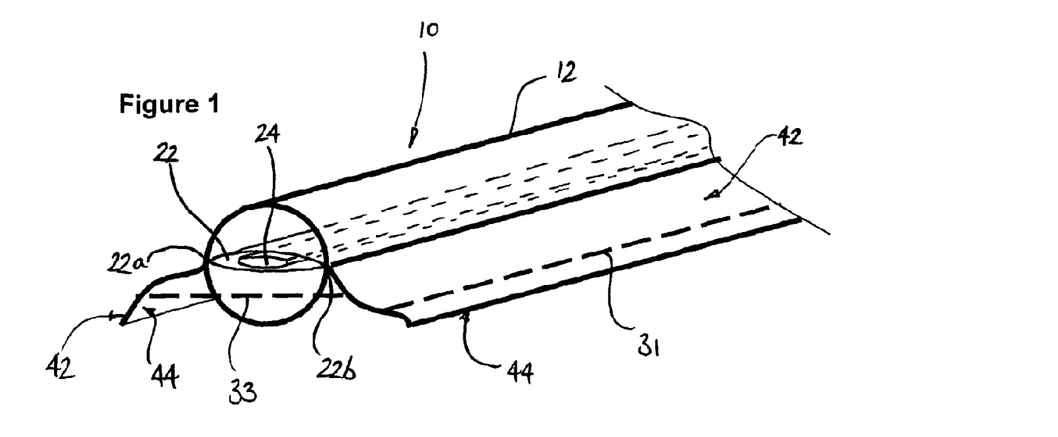
FIGS. 1 and 2 show a wave energy converter according to a first embodiment of the invention.

Referring to FIG. 1, the resultant waterline 31 of the liquid surface 32 relative to each of the fins 42 is lower than the resultant waterline 33 of the liquid surface 32 relative to the sleeve 12. This is caused by the loss of air, due to wave action, that creates lower air pressure beneath the sleeve 12. During wave action, the fins 42 allow air to escape, causing the edges of the fins 42 to sink, due to suction, thereby preventing any inlet of air between the planar contact surface 44 of the fins 42 and the liquid surface 32.

The wave energy converter 10 is designed to function as an attenuator with the bow end 16 moored via mooring 19a to face towards the wave fronts of incident waves and the stern end 20 moored via mooring 19b along the wave propagation direction 34.

The wave energy converter 10 draws air from the atmosphere at the air inlet 14 and air flows along the length of the sleeve 12, where it is pressurised, to produce compressed air at the stern end 20. The pressurised air is fed through the air outlet 18, via an outlet riser pipe 36 to the seabed, and then to land and/or to seabed storage through pipe 38.

To accommodate the compressibility of air, the diameter of the sleeve 12 decreases in diameter along its length. The moorings 19a,19b align the wave energy converter 10 relative to the direction of propagation 34 of incident waves so that the wave energy converter 10 may function as an attenuator.

Figure 3:
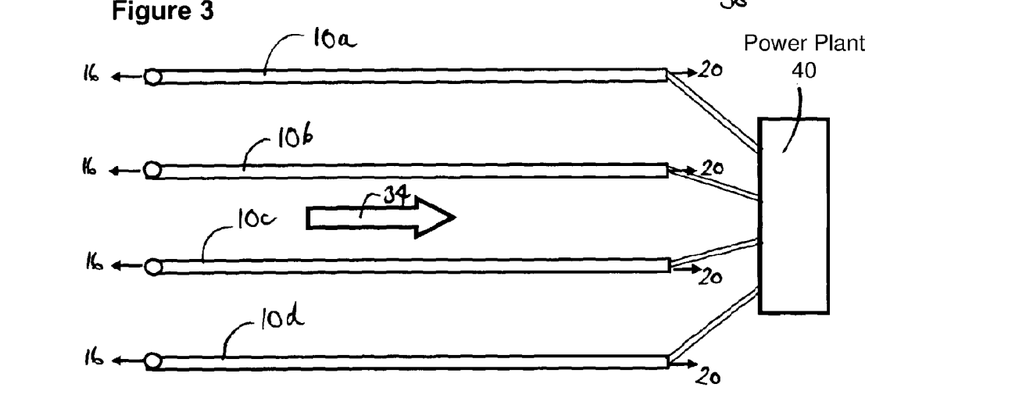
FIG. 3 shows the wave energy converter shown in FIGS. 1 and 2 combined with other wave energy converters.

In use, as illustrated schematically in FIG. 3, a plurality of wave energy converters 10a-10d may be arranged to work together to draw air from the atmosphere and feed compressed air to land for conversion to electrical power at a shore based plant 40. The wave energy converters 10 would be slack moored at the bow and stern ends 16,20 to maintain their positions relative to each other and to the direction of propagation 34 of incident waves. In the arrangement shown in FIG. 3, four wave energy converters 10a-10d are provided. It will be appreciated that the number of wave energy converters 10 may be increased or decreased depending on energy requirements and/or the space available in which to locate the wave energy converters 10.

Figure 4:
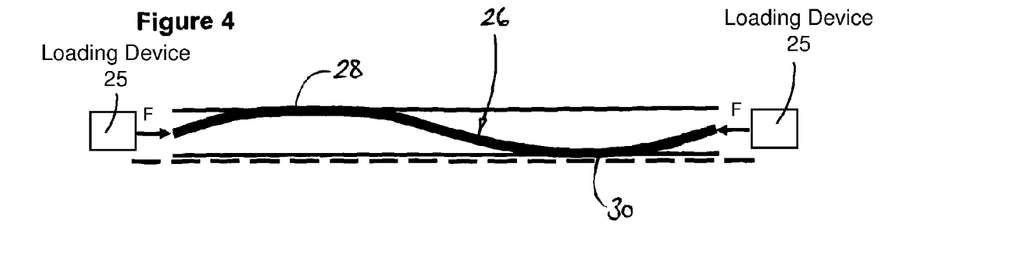
FIGS. 4 to 7 illustrate operation of the wave energy converter shown in FIGS. 1 and 2.

FIG. 4 illustrates schematically a section of the sleeve 12 of the wave energy converter 10 floating a calm liquid surface 32 following operation of the loading device 25 to apply a constant axial compressive force to the spine 24, relative to the sleeve 12, so as to buckle the spine 24 and diaphragm 22 to define a waveform 26. As will be appreciated, the amplitude of the waveform 26 is limited by the internal dimensions of the sleeve 12. In the absence of any incident waves, the waveform 26 defined by the spine 24 and the diaphragm 22 remains stationary.

Figure 5:
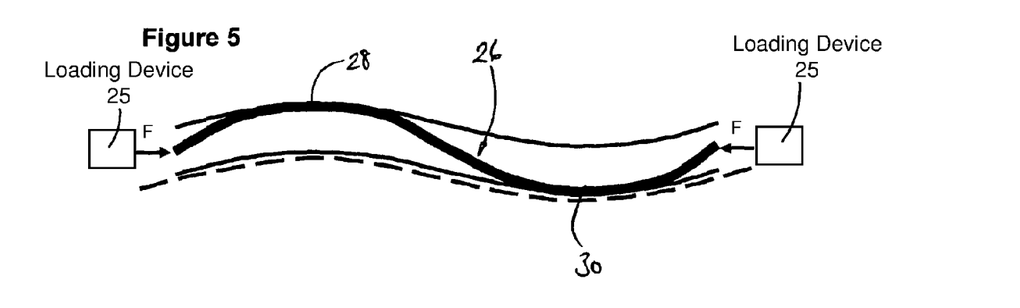

FIG. 5 illustrates schematically, the same section of sleeve 12 shown in FIG. 4 when the sleeve 12 is subjected to incident waves travelling over the liquid surface 32 and propagation along the length of the sleeve 12.

As illustrated in FIG. 5, the wave is physically coupled to transfer energy from the wave to an internal flexural wave and drives movement of the spine 22 and the diaphragm 24 so as to increase the amplitude of the waveform 26 defined by the spine 22 and the diaphragm 22. Pressure contact between the diaphragm 22 and the sleeve 12 occurs at the peak 28 and the trough 30, and this propagates the waveform 26 along the length of the sleeve 12 at wave velocity. When the wavelength of the incident wave corresponds to the wavelength of the waveform 26 defined by the spine 24 and the diaphragm 22, the power transferred from the wave to the spine 24 and the diaphragm 22, in the form of elastic strain energy, is maximised.

The location of the spine 24 retained within the diaphragm 22 during driving movement of the spine 24 and diaphragm 22 shown in FIG. 5 is illustrated in FIGS. 6a to 6d.

At the peak 28 of the waveform 26 (FIG. 6b), the spine 24 forces an upper surface 22c of the diaphragm 22 into sealing engagement with the inner surface of the sleeve 12, thereby creating a pocket 46 of air below the diaphragm 22.

At the trough 30 of the waveform 26 (FIG. 6d), the spine 24 forces a lower surface 22d of the diaphragm 22 into sealing engagement with the inner surface of the sleeve 12, thereby creating a pocket 48 of air above the diaphragm 22.

The diaphragm inverting transition 50 (FIG. 6c), near each point of inflexion in the waveform 26, moves along the sleeve 12 and pumps air contained in the pockets 46,48 along the sleeve 12 at wave velocity.

Figure 12:
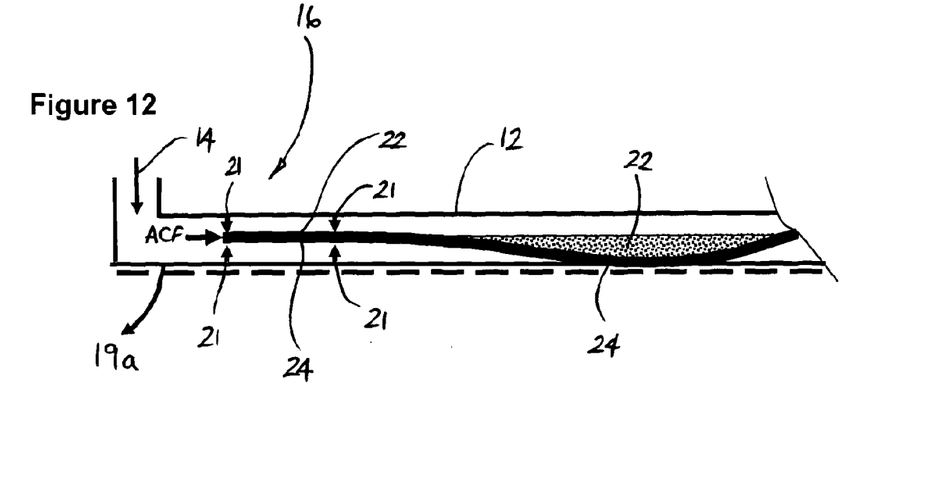
FIGS. 12 and 13 illustrate the flow of air into, through and out of the wave energy converter shown in FIGS. 1 and 2.

The flow of air into, through and out of the wave energy converter 10 may be described with reference to FIGS. 12 and 13. FIG. 12 shows the bow end 16 of the wave energy converter 10 where air is drawn through the air inlet 14 by suction pressure generated by the diaphragm inverting transition 50 moving along the sleeve 12 and pumping air contained in the pockets 46,48 along the sleeve 12 at wave velocity. The air flow drawn into the sleeve 12 via the air inlet 14 divides between the lower air pocket 46, and upper air pocket 48, that are defined and separated by the diaphragm 22.

The ends of the spine 24 and the diaphragm 22 are centrally located by guides 21 and are under a constant axial compressive force ACF provided by the loading device 25. This end restraint has to be designed to match the wave propagation characteristics of the spine 24 and the diaphragm 22 and needs to be non-reflective to initiate movement of the waveform 26 along the sleeve 12.

The primary mooring 19a attached to the bow end 16 of wave energy converter 10 maintains the wave energy converter 10 in an attenuator configuration.

Figure 13:
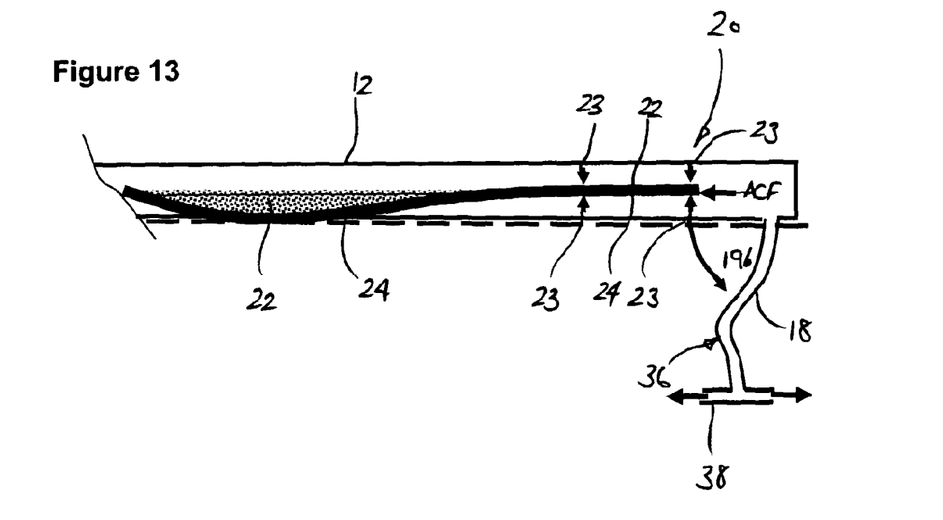

FIG. 13 shows the stern end 20 of the wave energy converter 10 where the compressed air is fed down a outlet riser pipe 36 the seabed for transmission to a load on land or storage by pipe 38.

The ends of the spine 24 and the diaphragm 22 are located centrally by guides 23 and under a constant axial compressive force ACF provided by the loading device. Again, this end restraint has to be designed to match the wave propagation characteristics of the spine 24 and the diaphragm 22 and needs to be non-reflective to encourage termination of movement of the waveform 26 along the sleeve 12.

The secondary mooring 19b is attached to the stern end 20 of the wave energy converter 10 to limit the excursion of the wave energy converter 10.

The wave energy converter 10 shown in FIGS. 1 and 2, and described with reference to FIGS. 4 and 5 and FIGS. 6a to 6d, the sleeve 10 is provided in the form of a hose or pipe having a relatively rigid cross-sectional shape and the diaphragm 22 is provided in the form of a relatively elastic member. In other embodiments, the rigidity and flexibility of the sleeve 10 and the diaphragm 22 may be interchanged.

Figure 7A:
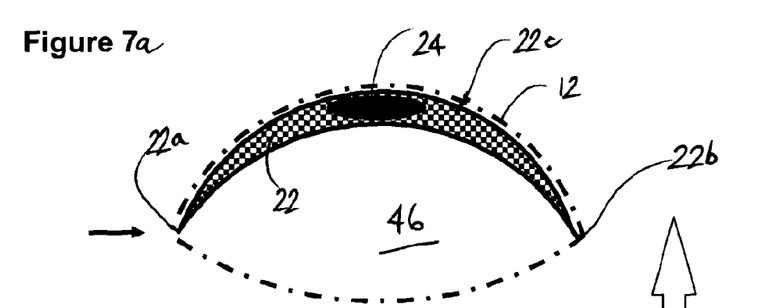
Figure 7B:
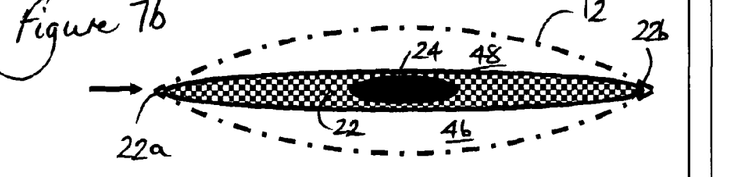
Figure 7C:
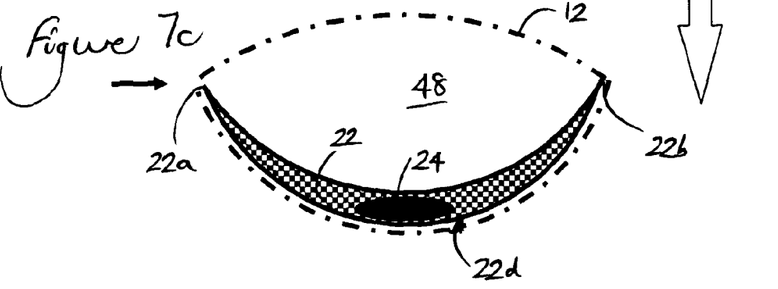

One such embodiment is shown in FIGS. 7a to 7c, and includes a relatively elastic sleeve 10 that defines a different cross-sectional shape along its length depending on the relative positions of the spine 24 and a relatively rigid diaphragm 22.

Referring to FIG. 7a, at the peak 28 of the waveform 26, the spine 24 forces the upper surface 22c of the diaphragm 22 into sealing engagement with the inner surface of the sleeve 12, thereby opening the cross-sectional area of the sleeve 12 and creating a pocket 46 of air below the diaphragm 22.

Referring to FIG. 7c, at the trough 30 of the waveform 26, the spine 24 forces the lower surface 22d of the diaphragm 22 into sealing engagement with the inner surface of the sleeve 12, again opening the cross-sectional area of the sleeve 12 and creating a pocket 48 of air above the diaphragm.

FIG. 7b shows the relative arrangement of the spine 24 and the diaphragm 22 at the diaphragm inverting transition 50, near each point of inflexion, which moves along the sleeve 12 and pumps air in the pockets 46,48 along the sleeve 12 at wave velocity as the waveform 26 travels along the sleeve 12, where the cross-sectional area of the elastic sleeve 12 is less than at the peak 28 (FIG. 7a) and at the trough 30 (FIG. 7c).

In the embodiment, the elastic properties of the sleeve 12 ensure the bead edges 22a,22b of the diaphragm 22 are kept in pressure contact and sealing engagement with the inner surface of the sleeve 12.

In another embodiment, the wave energy converter 10 shown in FIGS. 7a to 7c may be modified to include a flexible cover 52 attached to the opposed elongate edges 22a,22b of the diaphragm 22 at the hinge positions, the flexible cover 52 extending outwardly from the hinge positions to define the outwardly extending fins 42.

Figure 8:
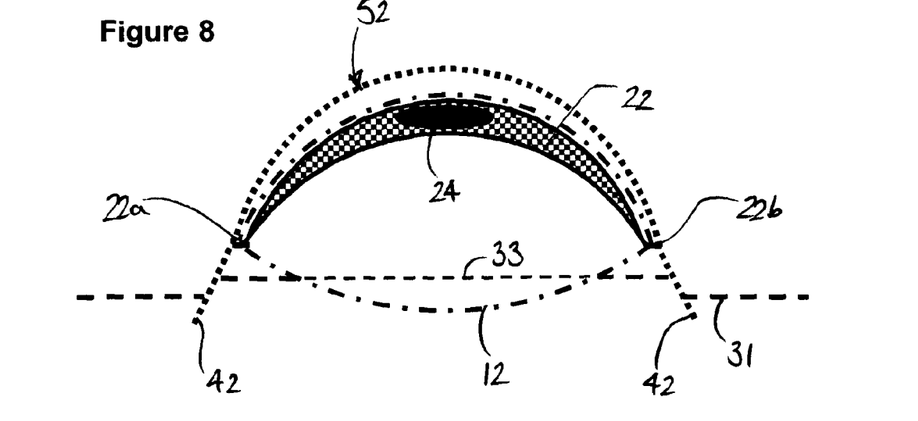
FIG. 8 illustrates operation of a wave energy converter according to a second embodiment of the invention.

In the similar manner to the wave energy converter 10 shown in FIG. 1, the suction waterline 31 of the fins 42 of the wave energy converter 10 shown in FIG. 8 relative to the liquid surface 32 is lower than the suction waterline 33 of the sleeve 12 relative to the liquid surface 32. This is caused by the loss of air, due to wave action, that creates lower air pressure beneath the sleeve 12. During wave action, the fins 42 allow air to escape, causing the edges of the fins 42 to sink due to suction, thereby preventing the inlet of air.

Figure 9:
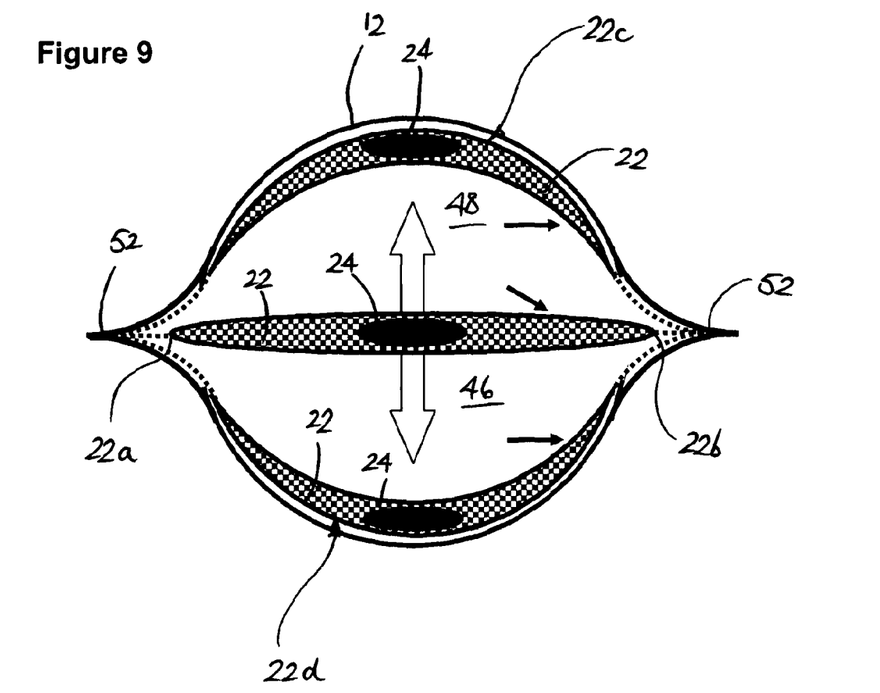
FIG. 9 illustrates operation of a wave energy converter according to a third embodiment of the invention.

A wave energy converter 10 according to a further embodiment of the invention is shown in FIG. 9 and includes a sleeve 12 defining a rigid cross-sectional shape in a similar manner to the sleeve of the wave energy converter 10 shown in FIGS. 1 and 2. FIG. 9 illustrates the cross-sections of the spine 24 and diaphragm 22 of the wave energy converter 10 according to this embodiment of the invention at the peak, 28 inverting transition 50 and trough 30, during propagation of the waveform 26 along the sleeve 12.

In the peak 28 of the waveform 26, the spine 24 forces the upper surface 22c of the diaphragm 22 into sealing engagement with the inner surface of the sleeve 12, creating a pocket 46 of air below the diaphragm 22. In the trough 30 of the waveform 26, the spine 24 forces the lower surface 22d of the diaphragm 22 into sealing engagement with the inner surface of the sleeve 12, creating a pocket 48 of air above the diaphragm 22.

The spine 24 and diaphragm are centrally located within the sleeve 12 at the diaphragm inverting transition 50, near each point of inflexion, which moves along the sleeve 12 and pumps air in the pockets 46,48 along the sleeve 12 at wave velocity.

In the embodiment shown in 9, the opposed elongate edges 22a,22b of the diaphragm 22 are attached to the sleeve 12 by the elastic hinges that profile around semi-rigid hose sections 52.

Figure 10:
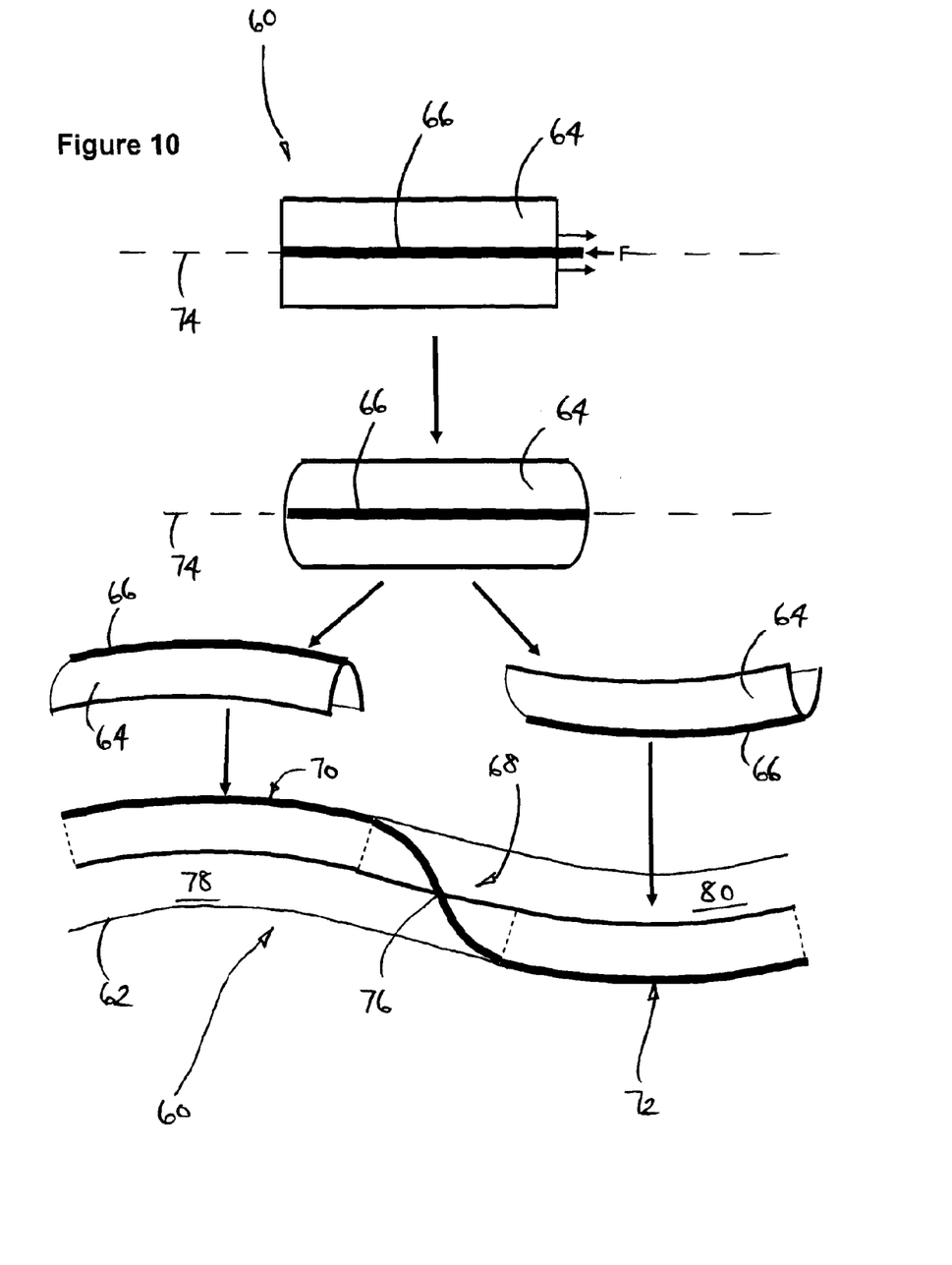
FIG. 10 shows a wave energy converter according to a fourth embodiment of the invention.

A wave energy converter 60 according to a yet further embodiment of the invention is shown in FIG. 10.

The wave energy converter 60 includes an inflatable sleeve 62 having an air inlet (not shown) at a bow end of the sleeve 62 and an air outlet (not shown) at a stern end of the sleeve 62.

A flexible diaphragm 64 is located within the sleeve 62 so as to extend lengthwise of the sleeve 62. The diaphragm 64 is sealingly engaged with an inner surface of the sleeve 62 along opposed, elongate edges 64a,64b by means of longitudinal flexible hinges (not shown). A spine 66 is retained within the diaphragm 64 so as to extend lengthwise of the diaphragm 64. The spine 66 is fixed with the diaphragm 64, relative to the sleeve 62, at both the bow end and the stern end of the sleeve 62.

The wave energy converter 60 also includes a loading device (not shown) that is operable to apply an axial compressive force F to the spine 66 relative to the diaphragm 64.

On operation of the loading device, the spine 66 and the diaphragm 64 are buckled into a waveform 68 constrained within the sleeve 62, the resultant waveform 68 defining one or more peaks 70 and one or more troughs 72.

The spine 66 is centrally located within the diaphragm 64 and the application of an axial compressive force to the spine 66, relative to the diaphragm 64, seeks to stretch the diaphragm 64 along a central line 74 thereof and results in the application of a tensile load along the opposed, elongate edges 64a,64b of the diaphragm 64. This tensile load dissipates with distance from each edge 64a,64b, towards the central line 74, so that the tensile load is least along the central line 74 of the diaphragm 64. This tensile load distribution across the width of the diaphragm 64 leads to the creation of opposed concave cross-sections at the peaks 70 and troughs 72 of the resultant waveform 68.

These concave cross-sectional shapes at the peaks 70 and troughs 72 are mirror image of each other, and can be induced to change state by the application of an applied force.

Figure 6A:
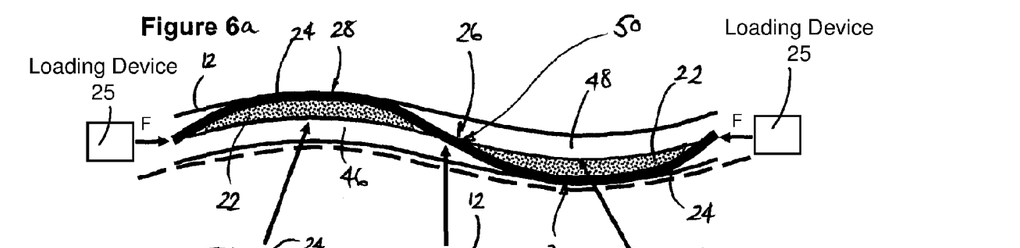
Figure 6B:
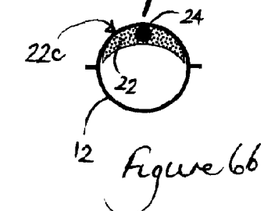
Figures 6C, 6D:
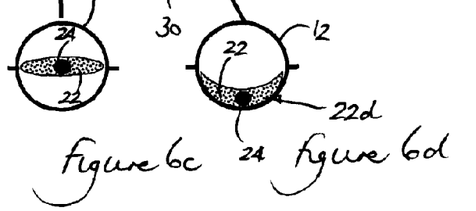

Combining the cross-sectional shapes through an inverting transition section 76 results in an effectively flat cross-sectional shape, corresponding to that shown in FIGS. 6c, 7b and 9.

When a wave is incident on the sleeve 62, during use of the wave energy converter 60 on the surface of a body of liquid, the transition 76 between the opposed concave cross-sectional shapes is driven by travelling movement of the waveform 68 along the sleeve 12 at the incident wave velocity. The inversion is designed to change in a linear manner so as to create a smooth inversion and to consume minimum energy during inversion.

The resultant face created being transition section 76 moving along the sleeve 62 acts like a piston in the form of a rolling seal, and applies pressure to air enclosed in pockets 78,80 below and above the diaphragm 64 respectively. A major advantage of the opposed concave cross-sectional shapes of the peaks 70 and troughs 72 of a waveform 68 created when an axial compressive load is applied to the spine 66 relative to the diaphragm 64 is the enhanced stiffness of the spine 66 and diaphragm 64 as a result of area moment of inertia of the cross-section of the spine 66 and the diaphragm 64.

In another, similar, embodiment, the diaphragm 64 may be provided in the form of a rectangular, flat sheet of elastic material that is reinforced along two opposed, elongate edges by two flexible beads.

The sheet of elastic material may be stretched along a central line to match the length of a relatively longer spine 66 and secured to each end of the spine 66 so as to apply an axial compressive force to the spine 66. Stretching of the sheet of elastic material in this manner will result in the same tensile load distribution across the width of the diaphragm 64 outlined above in relation to the arrangement shown in FIG. 10.

In a further embodiment of the invention, the concave cross-sectional shapes of the spine 66 and diaphragm 64 at the peaks 70 and troughs 72 of the resultant waveform 68 may be achieved in another manner.

Figure 11:
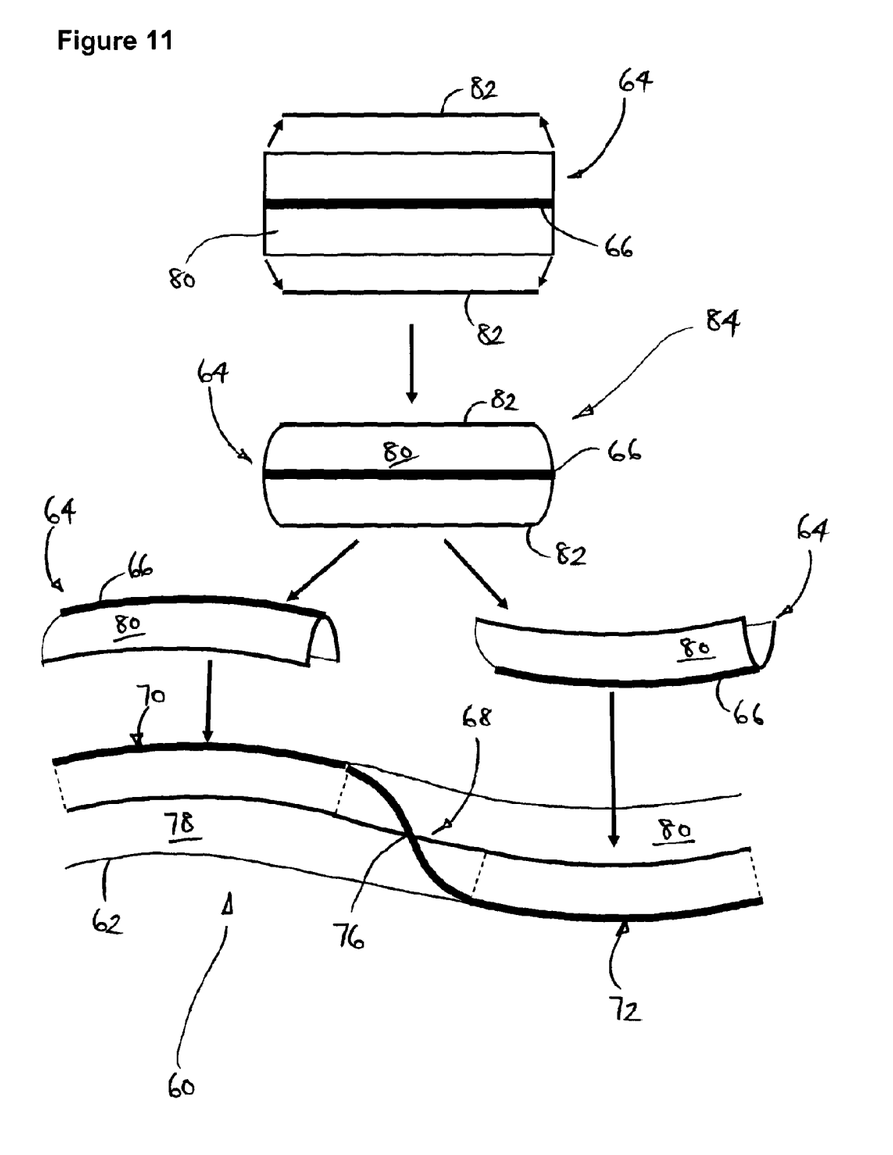
FIG. 11 shows a wave energy converter according to a fifth embodiment of the invention.

In such an embodiment, illustrated in FIG. 11, the diaphragm 64 includes a rectangular sheet of elastic material 80, having an integral spine section 66, and a pair of flexible beads 82 that are shorter in length than the elongate length of the rectangular sheet 80.

The elastic sheet 80 is first dimensionally compressed to match the length of the flexible beads 82 and is then bonded to the flexible beads to produce a distorted shape 84.

The resultant tensile load distribution across the width of the elastic sheet 80 means that the shape 84 is not stable as a flat sheet, and the elastic energy stored as a result of the compression of the elastic sheet 80 forces it the sheet 80 to form a concave cross-sectional shape.

When an axial compressive load is applied to the spine section 66, relative to the sleeve 62, the diaphragm 64 and spine section 66 are buckled into the waveform 68 constrained within the sleeve 62, the resultant waveform 68 defining one or more peaks 70 having a concave cross-section and one or more troughs 72 having a concave cross-section, the cross-sectional shape of each peak 70 being inverted when compared to the cross-sectional shape of each trough 72.

These profile shapes are the mirror image of each other and can be induced to change state by the application of an applied force.

Combining the cross-sectional shapes through an inverting transition section 76 results in an effectively flat cross-sectional shape, corresponding to that shown in FIGS. 6c, 7b and 9.

When a wave is incident on the sleeve 62, during use of the wave energy converter 60 on the surface of a body of liquid, the transition 76 between the opposed concave cross-sectional shapes is driven by travelling movement of the waveform 68 along the sleeve 12 at the incident wave velocity. The inversion is designed to change in a linear manner so as to create a smooth inversion and to consume minimum energy during inversion.

As with the embodiment shown in FIG. 10, the resultant face created being transition section 76 moving along the sleeve 62 acts like a piston in the form of a rolling seal, and applies pressure to air enclosed in pockets 78,80 below and above the diaphragm 64 respectively. A major advantage of the opposed concave cross-sectional shapes of the peaks 70 and troughs 72 of a waveform 68 is the enhanced stiffness of the spine 66 and diaphragm 64 as a result of area moment of inertia of the cross-section of the spine 66 and the diaphragm 64.

In each of the embodiments described above with reference to FIGS. 1 to 12, the sleeve may be provided in the form of a hose.

The invention claimed is:

1. A wave energy converter for extracting energy from waves in a body of liquid, the converter comprising:
    an inflatable sleeve having an air inlet at or towards one end and an air outlet at or towards its other end,
    a flexible diaphragm located within the sleeve so as to extend lengthwise thereof, the diaphragm being sealingly engaged with the sleeve along opposed, elongate edges thereof,
    a flexible spine retained within the diaphragm so as to extend lengthwise thereof, the spine being fixed with the diaphragm, relative to the sleeve, at or towards each end of the sleeve; and
    a loading device operable to apply an axial compressive force to the spine relative to the sleeve such that, on operation of the loading device, the spine and the diaphragm are buckled into a waveform constrained within the sleeve, the waveform having one or more peaks and one or more troughs, and the spine and diaphragm being drivable to move between first and second opposed positions so as to allow the waveform to travel along the sleeve and pump pockets of air contained between opposite surfaces of the diaphragm and the sleeve towards the air outlet.

2. A wave energy converter according to claim 1 wherein the diameter of the sleeve reduces in size between the air inlet and the air outlet.

3. A wave energy converter according to claim 1 wherein the loading device is operable to axially compress the spine relative to the diaphragm such that, on operation of the loading device, the stiffness of the waveform defined by the buckled spine and diaphragm is greater than the stiffness of the spine and diaphragm prior to operation of the loading device.

4. A wave energy converter according to claim 3 wherein the spine extends centrally along the length of the diaphragm and the loading device is operable to axially compress the spine relative to the diaphragm so that, on operation of the loading device, the diaphragm defines a concave cross-section at the or each peak of the waveform and a concave cross-section at the or each trough of the waveform, the concave cross-sectional shape of the diaphragm at the or each peak being inverted compared to the cross-sectional shape of the diaphragm at the or each trough, and the cross-sectional shape of the diaphragm extending between the or each adjacent peak and trough changing along its length between the inverted concave cross-sections.

5. A wave energy converter according to claim 4 wherein the cross-sectional shape of the diaphragm extending between the or each adjacent peak and trough changes along its length between the inverted concave cross-sections in a linear manner.

6. A wave energy converter according to claim 3, wherein the loading device includes a fixing member to maintain the spine in an axially compressed position relative to the diaphragm on operation of the loading device.

7. A wave energy converter according to claim 1, wherein the loading device is operable to apply a variable axial compressive force to the spine to facilitate adjustment of the wavelength of the waveform.

8. A wave energy converter according to claim 1, further including one or more fins extending outwardly from opposed sides of the sleeve, each of the fins defining a planar contact surface and being connected to the sleeve at predetermined positions relative to the opposed edges of the diaphragm sealingly engaged with the sleeve such that, in use, the planar contact surfaces of the fins engage the surface of a body of liquid.

9. A wave energy converter according to claim 1, wherein the sleeve has a length in the range of 100 m to 1500 m.

10. A wave energy converter according to claim 1, wherein the sleeve, diaphragm and spine are formed to define a flexible layflat construction.

11. A wave energy converter according to claim 1, wherein the air outlet is coupled to a collector.

12. A wave energy converter according to claim 11 wherein the collector includes a compressed air pipe, a compressed air tank and/or an air turbine to generate electrical power.

13. A method of extracting energy from waves in a body of liquid using a wave energy converter according to any preceding claim, the method comprising the steps of:
  operating the loading device to apply an axial compressive force to the spine to buckle the spine and the diaphragm into a waveform constrained within the sleeve; and
  floating the flexible sleeve on the surface of the body of liquid so as to extend tangentially relative to the direction of travel of the waves such that the incident waves travel from the air inlet towards the air outlet.

14. A method of extracting energy according to claim 13 further including the step of operating the loading device to adjust the axial compressive force applied to the spine so as to buckle the spine and the diaphragm into a waveform having a wavelength corresponding to the wavelength of the incident waves, wherein the loading device is operable to apply the variable axial compressive force to the spine to facilitate adjustment of the wavelength of the waveform.

* * * * *